United States Patent [19]

Reimer

[11] 3,794,954

[45] Feb. 26, 1974

[54] IMPROVED BUS SYSTEM FOR INTERCONNECTING SUBSYSTEMS OF A COMMUNICATION SWITCHING SYSTEM

[75] Inventor: William A. Reimer, Wheaton, Ill.

[73] Assignee: GTE Automatic Electric Laboratories Incorporated, Northlake, Ill.

[22] Filed: Sept. 11, 1972

[21] Appl. No.: 288,201

[52] U.S. Cl. ............... 339/19, 339/17 LC, 317/101

[51] Int. Cl. ......................... H01r 31/08, H05k 1/02

[58] Field of Search............. 339/17, 18, 19, 47–49, 339/65, 66, 176; 317/101, 122

[56] References Cited

UNITED STATES PATENTS

| | | | |
|---|---|---|---|
| 3,676,746 | 7/1972 | Kassabgi | 339/17 LC |
| 3,241,000 | 3/1966 | Roslyn, Jr. | 339/18 R X |
| 3,260,982 | 7/1966 | Bostwick | 339/17 LM |
| 3,604,984 | 9/1971 | Andreassen | 339/19 X |
| 3,560,799 | 2/1971 | Bochicchio | 317/101 DH |
| 2,951,184 | 8/1960 | Wyma | 317/101 DH |
| 3,692,966 | 9/1972 | Lancaster | 200/51.1 |
| 2,951,185 | 8/1960 | Buck | 339/17 LM X |

*Primary Examiner*—Bobby R. Gay
*Assistant Examiner*—Terrell P. Lewis
*Attorney, Agent, or Firm*—Bernard E. Franz

[57] ABSTRACT

A bus system arranged such that the number of interconnection points between subsystems or modules are substantially reduced so that interfacing costs likewise are reduced. The multiple for continuing the bus is located on an interface connector card which provides an interfacing between the bus cable and the subsystem or module, so that the continuity of the bus can be maintained, regardless of the system status of any subsystem or subsystems. Normally, with other similar bus systems, the continuity of the bus is disrupted if a subsystem is taken out of service. Furthermore, unlike many other bus systems, the bus can be extended in vertical and/or horizontal directions. The bus system also is such that the bus can be easily terminated by simply inserting a terminator card on the interface connector card, or it can be extended by withdrawing the terminator card and plugging in a bus jumper cable with a terminator card at the last module.

6 Claims, 5 Drawing Figures

IMPROVED BUS SYSTEM FOR INTERCONNECTING SUBSYSTEMS OF A COMMUNICATION SWITCHING SYSTEM

BACKGROUND OF THE INVENTION

Field of the Invention

This invention relates to an improved method and bus system for interconnecting subsystems of a communication switching system.

Many present day communication switching systems are constructed using a family of mutually compatible modular subsystems. These subsystems can be added and interconnected to satisfy the system requirements. The interconnections of the subsystems are established by means of a bus, with duplicated bus configurations being provided for reliability.

The present invention relates to such a bus system, the same being constructed such that the number of interconnection points between the subsystems or modules are substantially reduced so that interfacing costs are likewise reduced.

The subsystem is unique in several respects, including the fact that the multiple for continuing the bus is located on an interface connector card which provides an interfacing between the bus cable and the subsystem, so that the continuity of the bus can be maintained, regardless of the system status of any subsystem or subsystems. Normally, with other similar bus systems, the continuity of the bus is disrupted if a subsystem is taken out of service. Furthermore, unlike many other bus systems, the bus can be extended in vertical and/or horizontal directions. The bus system also is such that the bus can be easily terminated by simply inserting a terminator card in the multiple on the interface connector card, or it can be extended by withdrawing the terminator card and plugging in a bus jumper cable with a terminator card at the last subsystem.

Accordingly, it is an object of the present invention to provide an improved method and bus system for interconnecting subsystems of a communication switching system.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figures 1, 2, 3:
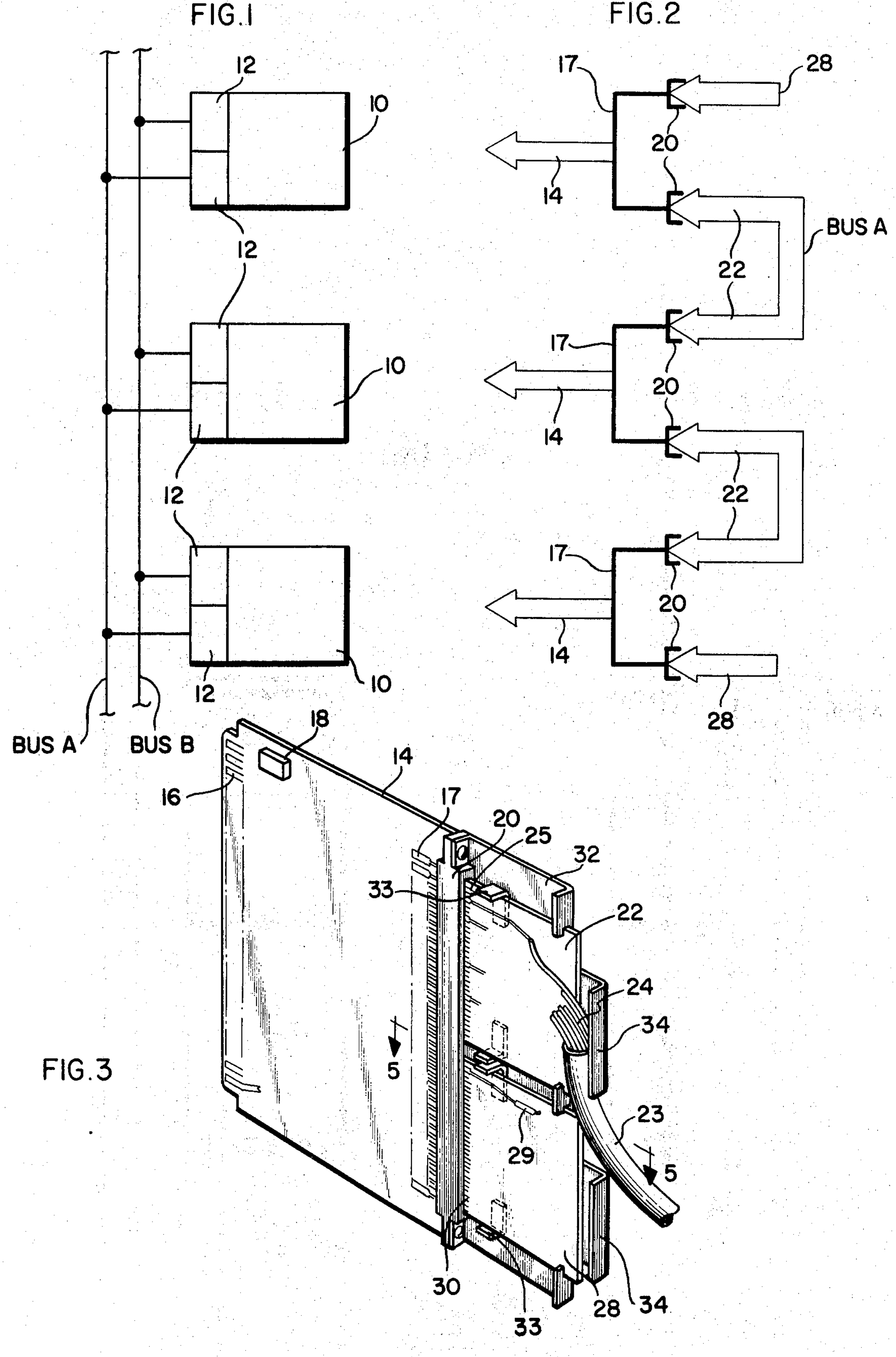
FIG. 1 is a block diagram schematic illustrating the duplicate bus systems, in the manner in which they are interfaced with several subsystems.
FIG. 2 is a schematic-type representation of the bus system.
FIG. 3 is a perspective view of the interface connector card, with one cable card affixed to one end of the jumper cable forming the bus and a terminator card plugged into it.

Referring now to the drawings, in FIG. 1 there is illustrated a family of mutually compatible modular subsystems 10 which are interconnected, in duplicate, by means of two bus systems, the bus A and the bus B. The buses connect the subsystems in a "daisy chain" pattern via bus interface connector assemblies 12 on each of the subsystems. In order to maximize speed and provide high noise immunity, the bus is terminated at each end by a plug-in terminator card 28 (FIGS. 2 and 3). There are no restrictions on the mixture of subsystems on the bus or on the order in which they are connected.

More particularly, the bus systems A and B each can be said to include a terminator card 28 (FIGS. 2 and 3), an interface connector card 14, and a bus cable 23 having a cable card 22, affixed to each of its opposite ends. As generally illustrated in FIGS. 1 and 2, the interface connector cards 14 provide the interfacing between the bus cable 23 and the interface connector assemblies 12 of the subsystems, and furthermore, are adapted to receive the terminator cards 28 for terminating a bus, as more fully described below. Since each bus system is of an identical construction, the description below is applicable to both.

Figure 5:
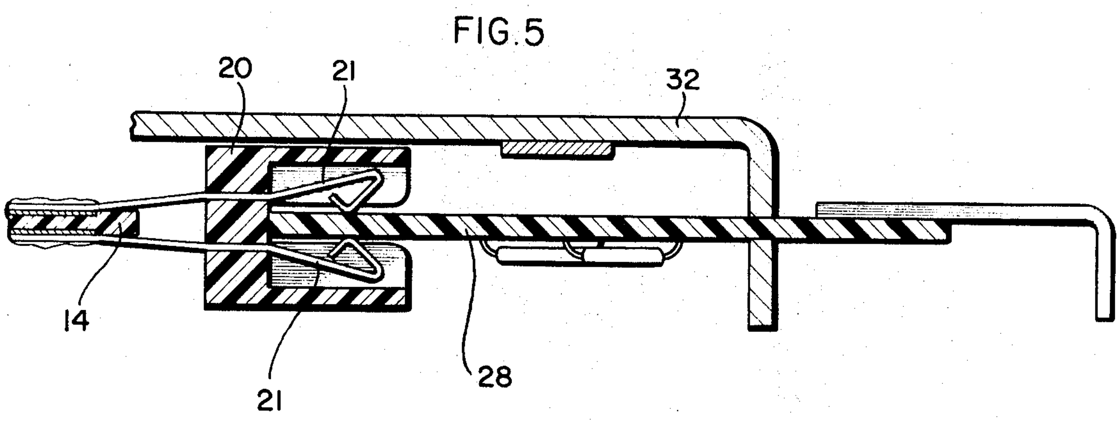
FIG. 5 is a sectional view taken along lines 5—5 of FIG. 3.

The interface connector cards 14, as can be best seen in FIGS. 2 and 3, include a double-sided printed wiring card having a pin connector 20 mounted on one of its two sides, for receiving therein the cable cards 22 and the terminator cards 28, as more fully described below. The interface connector cards 14 have printed wiring 17 thereon which are electrically coupled with a plurality of electrical components 18 such as, for example, receiver transformers, driver diodes and the like, for performing various circuit functions and for terminating the interface connector cards when they are electrically disconnected from the interface connector assemblies 12 on the subsystems 10. The printed wiring, furthermore, is electrically connected to the spring contacts 21 (FIG. 5) of the pin connector 20 and with printed wire contacts 16 which make electrical contact with the spring contacts of the interface connector assemblies 12.

Figure 4:
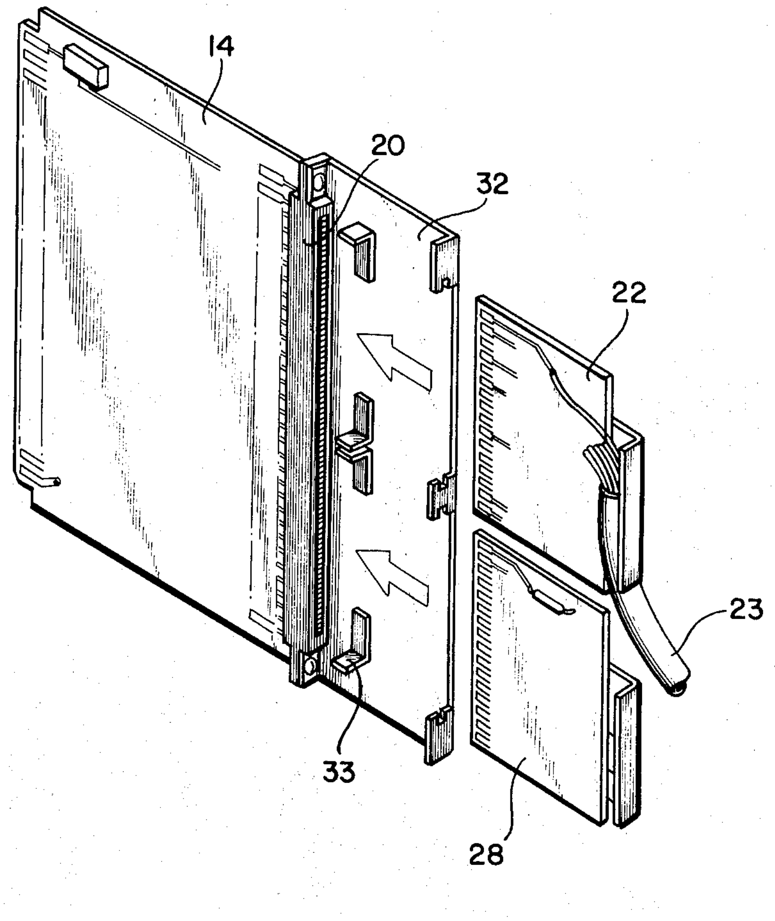
FIG. 4 is an exploded perspective view of the arrangement of FIG. 3.

The bus cable 23, as can be best seen in FIGS. 3 and 4, consist of a length of flexible plastic cable having encased therein a number of wires 24, with a printed wiring cable card 22 on each of its opposite ends. The wires 24 are connected to the printed wiring on the cable cards and the printed wiring terminates with a plurality of printed wiring contacts 25 which, when the cable cards 22 are plugged into the pin connectors 20, establish electrical contact through the spring contacts 21 therein. The bus cables 23 are conveniently provided in appropriate lengths to span from one subsystem to another, to connect them together in a "daisy chain" pattern.

The terminator cards 28 are each formed of a printed wiring card having printed wiring thereon which terminate with printed wiring contacts 30 which likewise are formed to establish an electrical connection with the spring contacts 21 of the pin connector 20. Appropriate components such as resistors 29 and the like for properly terminating the bus A or B and for providing noise immunity are affixed to the terminator cards 28 and are coupled to the printed wiring thereon.

A support bracket 32 is affixed to the interface connector cards 14 and have positioners 33 thereon for supporting and aligning the cable cards 22 and the terminator cards 28, when the latter are being plugged into or removed from the pin connector 20. A gripping bracket 34 can be affixed to the cable cards 22 and the terminator cards 28, for assisting in removing and plugging them into the pin connector 20.

In installing or adapting the bus system to the communication switching system, one or more of the interface connector assemblies 12 is affixed to each of the various different ones of the subsystems. All of the subsystems are connected to the bus A and/or B via these interface connector assemblies 12, with each subsystem being interfaced to the bus through the interface connector cards 14. In other words, the interface connector cards 14 are plugged into the interface connector assemblies 12 on the subsystems 10, to interface the subsystem with the bus A or B.

The continuity of the bus is not discontinued or interrupted when the interface connector cards 14 are removed or electrically disconnected from the interface connector assemblies 12, because of the fact that the multiple for the bus is located on the interface connector cards 14. More specifically, as generally indicated in FIG. 2, the cable cards 22 on each of the opposite ends of a bus cable 23 forming the bus A or bus B is plugged into the pin connectors 20 on two different interface connector cards 14, and extended in a similar manner from one subsystem to another, with the continuity of the bus being established through the connectors and the printed wiring 17 on the interface connector cards 14. To terminate the bus, a terminator card 28 is simply plugged into the pin connector 20, as illustrated in FIGS. 2 and 3. If it should be desired to extend the bus, the terminator card 28 is simply removed and an additional bus cable added by plugging in the cable cards 22 affixed to its opposite ends, and replacing the terminator card in the connector 20, on the interface connector card 14 associated with the last one of the subsystems in the chain.

As indicated above, the subsystems 10 are interfaced to the bus through the interface connector cards 14, but with the bus system described, the interface connector cards 14 can be removed, without interrupting the continuity of the bus. Furthermore, the bus cable 23 can extend in a vertical and/or a horizontal direction.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. A bus system for a communication switching system at least partially formed of a number of mutually compatible modular subsystems comprising, in combination:

a. a bus formed of a plurality of lengths of bus cable, each said length of bus cable being of a length to extend at least between two of said subsystems and having connector means on each of the opposite ends thereof;

b. an interface connector card affixed to each of the subsystems for providing an interfacing between said bus cable and a subsystem, each of said interface connector cards having thereon complimentary connector means for coupling with said connector means on said bus cables and a multiple for continuing said bus, whereby the continuity of said bus is maintained regardless of the system status of any of the subsystems; and c. terminator means for terminating each of the terminal ends of said bus.

2. The bus system of claim 1, wherein said terminator means comprises a terminator card having connector means on it complimentary with said connector means on said interface connector card, the terminal ends of said bus being terminated by affixing said terminator card to the terminal one of the subsystems.

3. The bus system of claim 1, wherein said interface connector card has a pin connector on it for receiving and establishing electrical contact with the connector means on said bus cable and said terminator means, said interface connector card having contact means thereon for electrically coupling it with complimentary connector means of the subsystems for interfacing the subsystem with said bus and multiple means thereon for maintaining the continuity of said bus.

4. The bus system of claim 3, wherein said multiple means comprise printed circuit wiring on said interface connector card coupling the portion of said pin connector receiving the connector means on one of said bus cables with the portion thereof receiving the connector means on another one of said bus cables, or a terminator means.

5. The bus system of claim 3, wherein said connector means on each of the opposite ends of said bus cable comprises a printed wiring card having printed wiring contacts thereon, said pin connector receiving therein said printed wiring card and establishing electrical contact via said printed wiring contacts, said printed wiring card further having printed wiring thereon establishing electrical contact with said length of bus cable.

6. The bus system of claim 3, wherein said interface connector card has a support bracket affixed to it with positioner means for positioning and aligning said connector means on said bus cable and said terminator means, when inserting and removing said connector means and said terminator means.

* * * * *